Feb. 28, 1950     H. ASHWORTH ET AL     2,499,083

SELF-BASTING FRYING PAN

Filed Nov. 29, 1947

INVENTORS
HANDEL ASHWORTH
FRANK P. HEALY

BY *Van Deventer & Grier*

ATTORNEYS

Patented Feb. 28, 1950

2,499,083

UNITED STATES PATENT OFFICE 2,499,083

SELF-BASTING FRYING PAN

Handel Ashworth and Frank P. Healy, Baldwin, N. Y.

Application November 29, 1947, Serial No. 788,822

7 Claims. (Cl. 99—425)

1

This invention relates to improvements in self-basting frying pans and has for an object the provision of a vessel having a stationary frying area at one level and a movable frying area at a level above the level of the first area.

Another object of the invention is the provision of a frying pan of the character described in which the stationary frying area is divided into a plurality of separated smaller areas and in which the movable member carrying the second frying area has a drip outlet for each of said smaller frying areas, said outlets being disposed along one edge thereof, and said member being adapted to be moved to variably position said outlets with respect to said smaller frying areas.

Other objects and advantages of the invention will be apparent to those skilled in the art upon a study of the following specification.

Referring to the drawings which are given by way of example to illustrate the invention;

Figure 1:
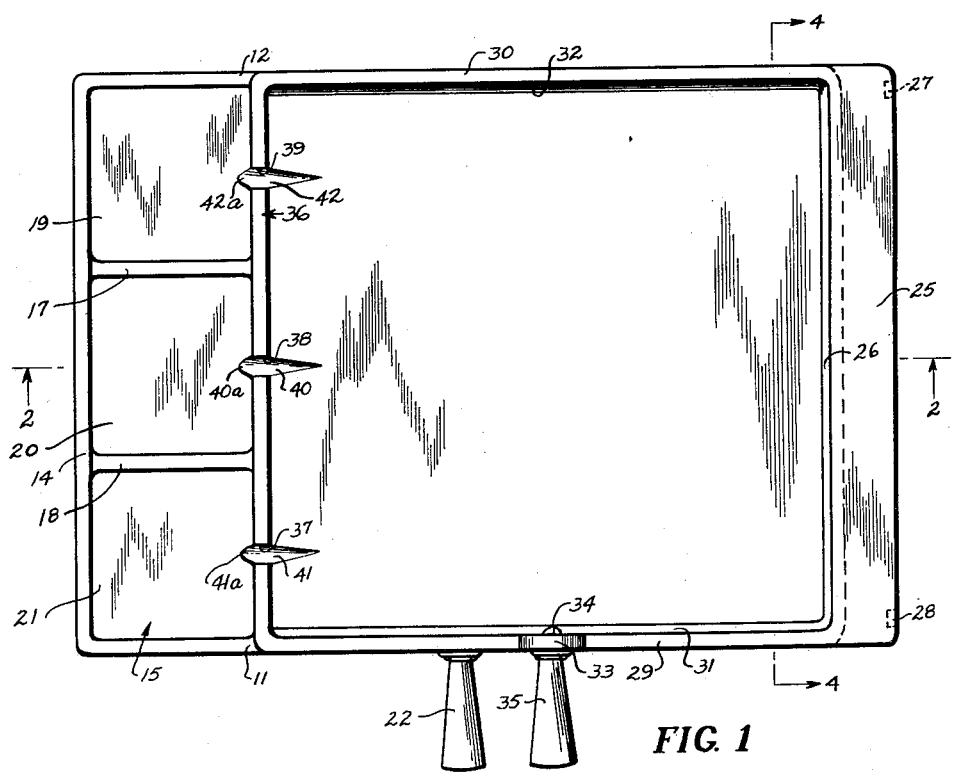
Figure 1 is a plan view of our new and improved self-basting frying pan.
Figure 2:
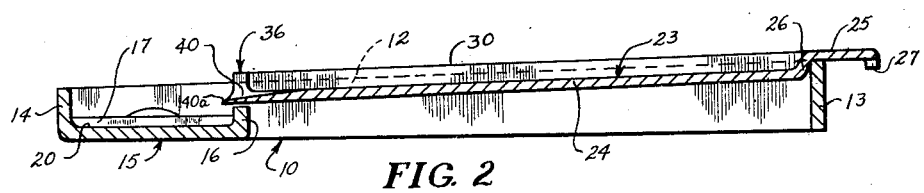
Figure 2 is a sectional elevation taken along the lines 2—2 of Figure 1.
Figure 3:
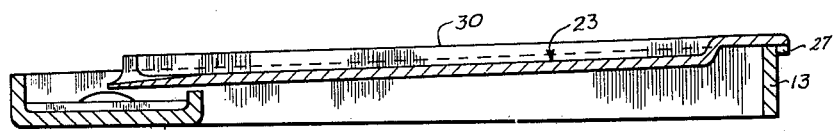
Figure 3 is a sectional elevation similar to Figure 2 except that the movable member has been advanced to position the drip outlets over the center of each of the smaller frying areas.

The frying pan has a main body 10 having spaced sides 11 and 12 joined by end webs 13 and 14, thus forming a rectangular frame. Near the left end, as seen in Figure 1, the sides 11 and 12 are joined by a horizontal web 15, and the right edge of this web, as seen in Figure 2, terminates in a vertical web 16, the height of which is approximately half of the height of the sides 11, 12, 13 and 14. The sides 11 and 12 are inclined toward the end web 14 so that the height of the web 13 is greater than the height of the web 14.

Formed integral with the web 15, the side 14, and the vertical web 16, are shallow webs 17 and 18 which divide the area of the web 15 into frying areas 19, 20, and 21. All the parts described above constitute the stationary portion of our improved self-basting fryer. Thus we have a hollow rectangular frame having at one end the series of frying areas 19, 20, and 21.

A handle 22 is secured to the side 11 at a mid point thereon. A vessel 23 has a bottom portion 24 the upper surface of which constitutes a frying area. The portion 24 has a horizontal extension 25 and an inclined portion 26 joining the portion 25 and the frying area 24. The under

2 surface of the first portion 25 rests on the top surface of the vertical side 13. On the outer edge of the portion 25 are depending stops 27 and 28 which engage the vertical side 13 when the vessel 23 is moved to the left a predetermined distance. From the above it will be seen that the vessel 23 forms a closure for the above portion of the main body 10 regardless of whether the vessel 23 is moved to the right as far as it will go, or moved to the left as far as it will go. This being the case, our new and improved fryer always presents a closed cavity to the heat of the gas burner or any other heat source and, consequently, produces the best results.

Figure 4:
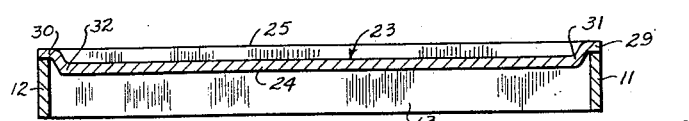
Figure 4 is a sectional elevation taken along the lines 4—4 of Figure 1.

The vessel 23 has oppositely disposed level extensions 29 and 30 which are joined to the portion 24 by inclined webs 31 and 32 respectively. The under surfaces of the flat portions 29 and 30, as may be seen in Figure 4, are slidably positioned on the upper edges of the sides 11 and 12. The extension 29 has an upstanding boss 33 with a cross hole therein to accommodate a screw 34 which threadedly engages a handle 35. An upstanding web 36 is formed integral with the left edge of the vessel 23 and this web has slots 37, 38 and 39 formed therein, and at the bottom of the slot 38 an extended depression 40 is formed in the vessel with an extended lip 40a, as may be seen in Figure 2. The slots 37 and 39 likewise have identical depressions 41 and 42 respectively, and have extended lips 41a and 42a. In Figure 1 the vessel 23 is shown in the retroactive position where the vessel 23 completely covers the opening bounded by the sides 11, 12, 13 and 16.

Now, assuming that a person wanted to fry ham, bacon, or sausage with their eggs. The ham, bacon, or sausage would be placed on the surface 24 with the vessel positioned over the heating means; for example, a gas burner. Due to the slight incline of the surface, the grease which is fried out of the meat on the surface 24, would drain toward the left edge, and via the depression 40, 41 and 42 it would drip into the frying areas 19, 20 and 21. After some grease has dripped into these areas the eggs may be broken and placed into them.

Now, in order to get a good fried egg, the upper surface of the egg should be basted with hot grease. By grasping the handle 35 and moving the vessel 23 toward the left until the stops 27 and 28 encounter the edge 13, the cook has the lips 40a, 41a and 42a centrally positioned above the eggs on the frying areas 20, 21 and 19 respectively.

The fact that our vessel 23 is removable, facilitates cleaning the device.

In the above example given to illustrate the invention, the sides 11 and 12 are inclined in the direction of the lower frying areas 19, 20 and 21, and the vessel 23 is shown as having its frying surface level with the webs 25, 29, 30 and 36, so that when it is positioned on the inclined sides 11 and 12, the frying surface 24 is inclined. Another form of the device which produces the same effect, and of which we have constructed such devices, has the sides 11 and 12 level with the sides 13 and 14, and the surface of the vessel 23 is inclined. We contemplate making these devices both ways.

Although we have herein shown and described, by way of example, a self-basting frying pan for ham, bacon, or sausage and eggs and other foods, and have shown a frying vessel upon which a second frying vessel is movably supported, it is obvious that many changes may be made in the arrangements shown and described within the scope of the appended claims.

What is claimed is:

1. In a fryer, an open rectangular frame having side walls the thicknesses of which are less than the height, a frying area formed therein adjacent to one end thereof and having a level above the lower edges of said sides, said frying area having a bounding edge the upper level of which is lower than the level of the upper edges of said side walls, a second vessel slidably mounted on the upper edges of said side walls and having a frying area inclined towards the end containing said first frying area, the lower surface of said last frying area being adapted to clear said bounding edge, and drain means formed in said second vessel for allowing fluid on said second frying surface to drip onto said first frying area.

2. In a fryer, an open rectangular frame having side walls the thicknesses of which are less than the height, a frying area formed therein adjacent to one end thereof and having a level above the lower edges of said sides, a bounding edge for said frying area parallel to the end to which said frying area is adjacent and joining the lateral side of said frame the upper level of said bounding edge being lower than the level of the upper edge of said side walls, partition means dividing said frying area into a plurality of smaller areas, a second vessel slidably mounted on the upper edge of said side walls and having a frying area inclined towards the end containing said first frying area, the lower surface of said last frying area being adapted to clear said bounding edge, and drain means formed in said second vessel for allowing fluid from said second frying surface to drip onto said first frying area and comprised of a drain for each of said smaller areas.

3. The invention according to claim 2, in which said second vessel has opposed flat surfaces bearing on the opposite side walls of said frame and a substantially wider flange portion overhanging the end side wall opposite said first end, and stop means depending from the edge of said extension adapted to engage said last end when said second vessel is slid forwardly, thereby limiting the forward movement of the same.

4. The invention according to claim 2, in which said second vessel has opposed flat surfaces bearing on the opposite side walls of said frame and a substantially wider flange portion overhanging the end side wall opposite said first end, and stop means depending from the edge of said extension adapted to engage said last end when said second vessel is slid forwardly, thereby arresting said second vessel with said drain means centralized over said smaller areas and adapted to baste food thereon.

5. In a fryer, a vessel having an area at one level therein, partition means dividing said area into a plurality of smaller frying areas, a second vessel movably positioned on said first vessel and having a frying area above the level of said first frying areas, and drain means formed on said second vessel for allowing fluid to drain therefrom and comprised of an extended lip for each of said smaller areas adapted to direct the dripping fluid to different portions of said smaller frying areas.

6. In a fryer, an open rectangular frame having side walls the thicknesses of which are less than the height, the sides of said frame having the upper surfaces of its side walls inclined toward one end so that the height of one end wall is less than the height of the other, a frying area formed therein adjacent to said last mentioned end and having a level above the lower edges of said sides, a bounding edge for said frying area parallel to and joining the lateral side of said frame, the upper level of said bounding edge being lower than the level of the upper edge of said side walls, partition means dividing said frying area into a plurality of smaller areas, a second vessel slidably mounted on the upper edge of said side walls, the lower surface of said last frying area being adapted to clear said bounding edge, and drain means formed in said second vessel for allowing fluid from said second frying surface to drip onto said first frying area and comprised of a drain for each of said smaller areas.

7. A fryer according to claim 6, in which said second vessel has formed integral therewith, and adapted to overhang, the taller of said end walls, a substantially horizontal flange portion which forms a closure for the open frame for all adjusted positions of said second vessel so that heat from a source is retained within the hollow under area and more evenly distributed to the frying surfaces.

HANDEL ASHWORTH.
FRANK P. HEALY.

REFERENCES CITED

The following references are of record in the file of this patent:

UNITED STATES PATENTS

| Number | Name | Date |
|---|---|---|
| 759,618 | Korbel | May 10, 1904 |
| 1,707,532 | Moon | Apr. 2, 1929 |
| 1,736,223 | Silen | Nov. 19, 1929 |
| 1,745,340 | Parker | Jan. 28, 1930 |
| 1,908,806 | Allen | May 16, 1933 |
| 1,936,551 | Garrison | Nov. 21, 1933 |
| 1,995,591 | Sussman | Mar. 26, 1935 |
| 2,218,367 | Van Ness | Oct. 25, 1940 |
| 2,262,538 | Olson et al. | Nov. 11, 1941 |
| 2,332,117 | Shepherd | Oct. 19, 1943 |

FOREIGN PATENTS

| Number | Country | Date |
|---|---|---|
| 16,975 | Great Britain | July 17, 1914 |
| 22,760 | Great Britain | Nov. 19, 1914 |
| 509,011 | Great Britain | July 6, 1939 |